Figure 3:
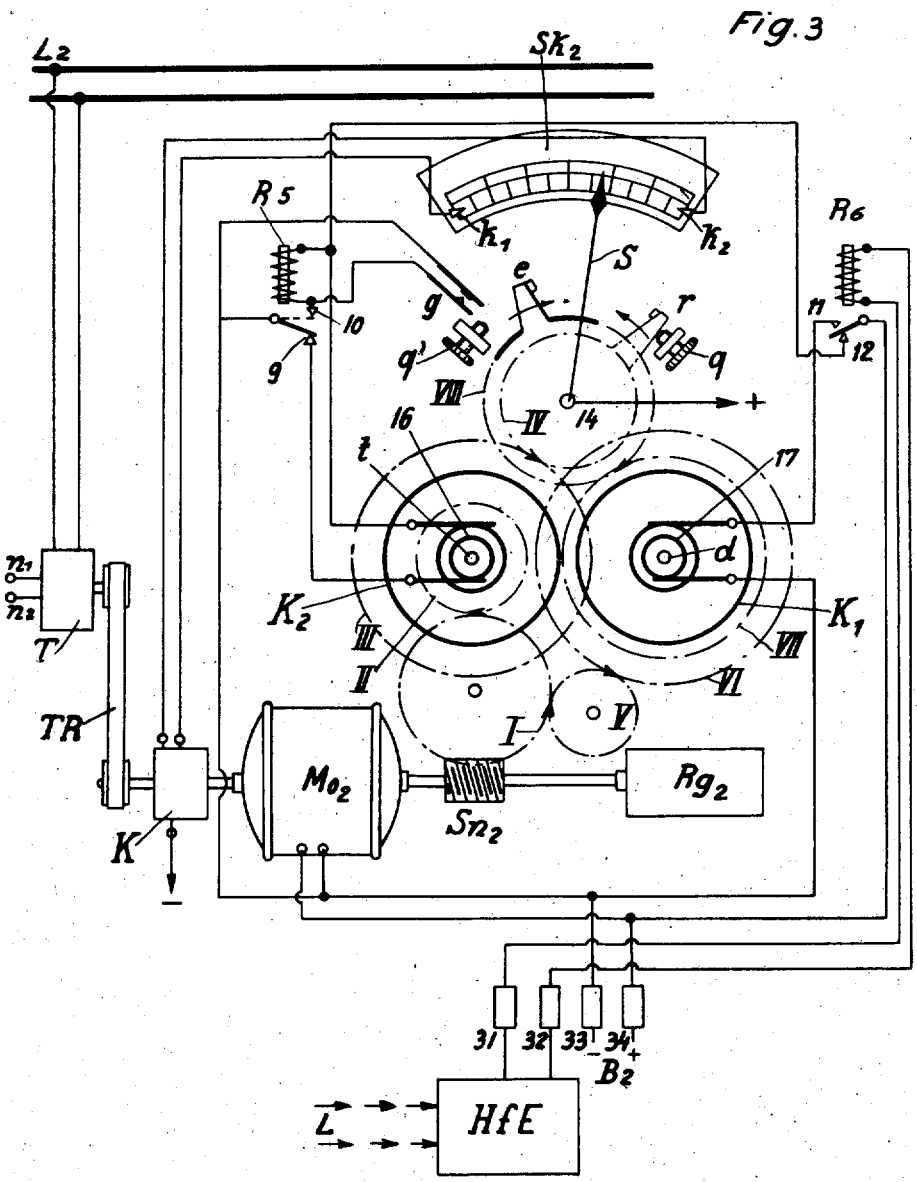

Dec. 18, 1934.  K. WILDE  1,985,130
TELEMETRIC RECEIVER
Original Filed Oct. 22, 1927   3 Sheets-Sheet 1
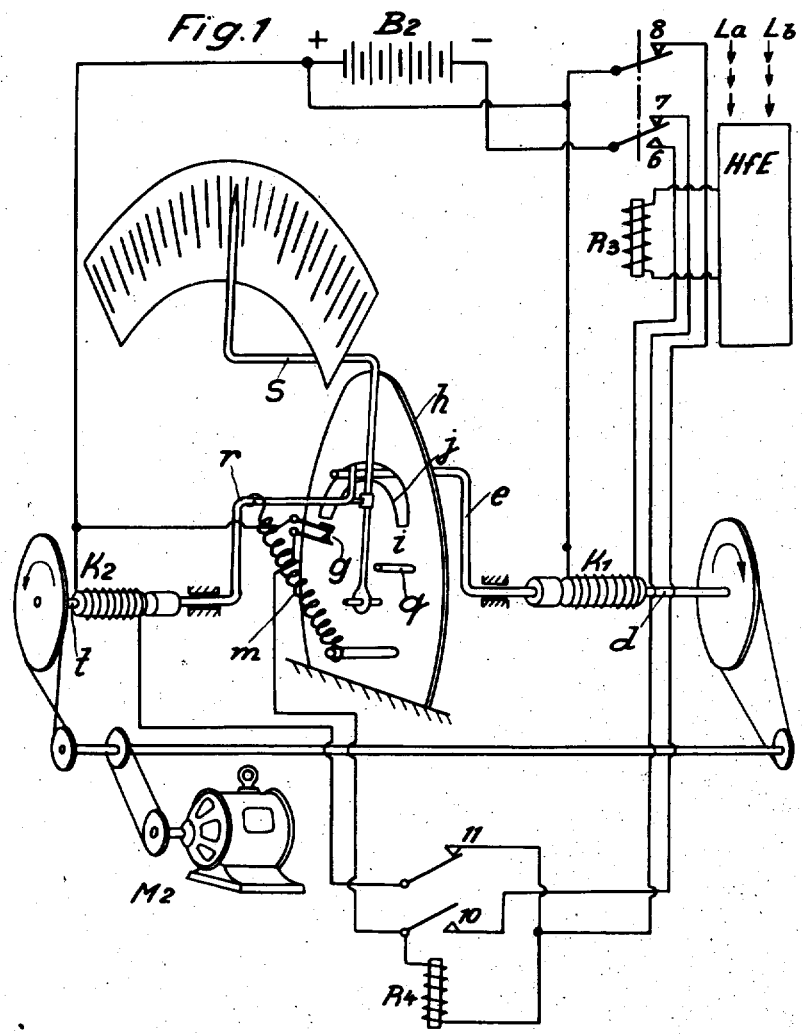

Dec. 18, 1934.　　　　K. WILDE　　　　1,985,130
TELEMETRIC RECEIVER
Original Filed Oct. 22, 1927　　3 Sheets-Sheet 2
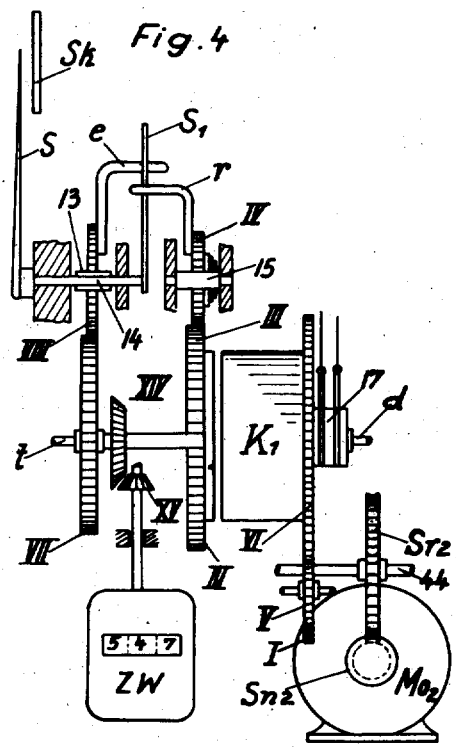
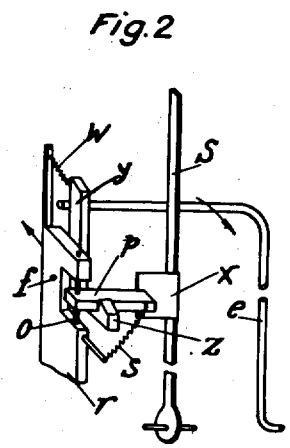
Inventor
Kurt Wilde
By
Attorneys.

Patented Dec. 18, 1934

1,985,130

UNITED STATES PATENT OFFICE 1,985,130

TELEMETRIC RECEIVER

Kurt Wilde, Berlin-Wilmersdorf, Germany, assignor, by mesne assignments, to Builders Iron Foundry, Providence, R. I., a corporation of Rhode Island Original application October 22, 1927, Serial No. 227,933, now Patent No. 1,822,683, September 8, 1931. Divided and this application March 21, 1929, Serial No. 348,962, renewed February 9, 1934. In Germany October 23, 1926

20 Claims. (Cl. 177—351)

This application is a division of my prior patent application Serial No. 227,933 filed October 22, 1927 which has matured into Letters Patent No. 1,822,683 dated September 8, 1931.

The invention relates to receivers of apparatus for electrically transmitting to a distance the indications of a measuring instrument or the like, of the kind in which a pointer or the like in the receiver is set periodically in correspondence with a pointer or the like in the transmitter by means of contact operations, which are made in the transmitter and act upon the receiver.

According to my present invention, for each transmission of a value to be measured, a member which shifts the pointer or the like is driven at the receiver, at a predetermined speed from a constant starting point by a mechanism operated by successive current modifications received over a transmitting line for putting said mechanism into and out of action.

Further features of the invention will appear from the following description and the accompanying drawings.

In the accompanying drawings Fig. 1 shows diagrammatically one form of the new receiver. Fig. 2 shows a detail. Figs. 3 and 4 show a practical embodiment of the receiver with further details of the invention.

At the receiving station (Fig. 1) for example a high frequency receiving equipment H/E of any known kind responds to a high frequency current sent from the distant transmitting station over the lines La, Lb. Thereby the relay R3 is excited as long as current flows over the line. Relay R3 closes contact 6 and opens contacts 7 and 8. Contact 6 puts in circuit the magnetic clutch K1, thereby coupling crank arm e with shaft d which is constantly rotated in the direction of the arrow by motor M2. The end of arm e moves in a slot j in disc h and starts from contact g which corresponds with a contact of the transmitter. If it encounters the pointer S during its movement, it carries the pointer with it so far as it goes, that is to say so long as relay R3 is excited. The pointer S is double cranked so that its end may move over a scale on the front of the receiver casing. The distance of pointer S from the point g corresponds with the distance of the pointer in the transmitter from its zero position. In other words, the two pointers have the same position on their respective scales.

Upon the de-energization of relay R3, clutch K1 is uncoupled, and the circuit of clutch K2 completed at contact 7 over contact 11 of relay R4. Clutch K2 connects the arm r, normally held by spring m at the end i of slot j, with shaft t which is driven in the opposite direction to shaft d. Arm r is thereupon turned from i to g, meeting arm e on its way and taking it along to g, while the balanced pointer S remains where it is. As soon as arm r reaches contact g the circuit of relay R4 is closed, the relay is excited and completes at contact 10 a holding circuit for itself over contacts 7, 8 of relay R3, and breaks at contact 11 the circuit of clutch K2, thus freeing arm r and permitting it to be returned by spring m to its position of rest i. The apparatus is then ready for the next transmission, and until that occurs relay R4 remains excited. It is de-energized when relay R3, excited afresh over the lines La, Lb, opens contacts 7 and 8.

It will sometimes occur that arm e will come to a stand-still before it reaches pointer S, the preceding deflection having been greater. Means are then required to return pointer S to the position at which arm e stops. For this purpose the end of arm r is fitted with a movable finger which strikes pointer S and carries it along to arm e. At the instant arm r touches arm e, the resistance of the latter puts the finger out of action, so that the pointer S is freed and stands still, while the two arms r and e move on to g.

In the example of the invention so far described and illustrated the pointer S in the receiver is designed to correspond exactly with the pointer in the transmitter. Thus the deflections of the receiver pointer S are always exactly equal to those of the transmitter pointer. The necessary proportionality of the two deflections may however be obtained though the receiver deflections be made larger or smaller than those of the transmitter by corresponding calibration of the receiver scale.

Fig. 2 shows on a larger scale the means by which arm r carries along either only the pointer S and then leaves it standing or carries along only arm e. The upper end of arm r carries a finger p pivoted on o and normally held in the position illustrated against the action of spring s by a hook z on bell crank lever y engaging it. Bell crank lever y is pivoted at f and acted on by spring w. When finger p engages the projection x on pointer S the latter is carried along until the radial arm of bell crank lever y strikes against arm e. As arm r continues moving the resistance of arm e suffices to turn bell crank lever y so that it releases finger p. The finger then slips past projection x and pointer S is left behind. Arm e on the other hand is carried on by the radial arm of lever y to the abutment q1 (Fig. 3). When arm r thereupon returns clockwise, finger p, being held in a slanting position by spring s, passes projection x on pointer S without touching it, so that the pointer is not moved. When arm r strikes abutment q finger p is pressed behind the hook z again and is ready once more to carry along the pointer to the position of arm e.

A practical embodiment of the new receiver is illustrated in Figs. 3 and 4. The high frequency current received over line L actuates a high frequency equipment H/E causing relay R6 to be energized as long as the current flows. At contact 11 relay R6 completes the circuit of a magnetic clutch K1 (Fig. 4) which couples the rotating shaft d with the gear wheel VI loose upon it. Shaft d is continuously rotated in the direction of the arrow in Fig. 3 by an electric motor Mo2, fitted with a braking governor Rg2, through the worm gear Sn2, Sr2 and the gear wheel I, brushes upon the slip rings 17 conveying current to the rotating electromagnet of the clutch.

A gear wheel VII connected with gear wheel VI meshes with a pinion VIII which has a hub 13 rotating on spindle 14 and carries an arm e which therefore is revolved in the direction of the arrow in Fig. 3. Another clutch K2 (Fig. 3) also driven by the motor Mo2 through gearing I, II, but in the opposite direction to clutch K1, couples shaft t (which is hidden in Fig. 4) to a gear wheel III upon it, meshing with gear wheel IV which rotates on shaft 15 and carries arm r. Slip rings 16 convey current to the clutch K2 while rotating, from contact 9 of relay R5 and contact 12 of relay R6.

Arm e serves to shift the pointer S forward, arm r to shift it backward, these arms acting on a rod S1 upon the spindle 14 of the pointer S. The pointer S is freely movable and stays in the position in which it is set by the arms e and r until shifted. Normally arm e rests to the left against an abutment q1 and arm r to the right against an abutment q. In the position of rest, the arm e holds contact g closed.

The receiver works as follows:—

The high frequency current over line L keeps relay R6 excited as long as it lasts. For the same period of time the circuit of clutch K1 is closed at contact 11, and arm e is rotated away from the abutment q1, clockwise in Fig. 3. If in its movement arm e encounters rod S1 it carries the pointer S forward. When it comes to a standstill the pointer S corresponds with the pointer of the transmitter. Arm e is brought to a standstill by relay R6 opening contact 11 and throwing out the clutch K1. For the moment both arm e and pointer S remain where they are.

Upon opening contact 11 relay R6 also closes contact 12 and puts clutch K2 in circuit over contact 9 of relay R5. Shaft t is therefore rotated and arm r moves anticlockwise from the abutment q. As soon as it encounters arm e it carries it along, while rod S1 and pointer S remain stationary. If arm e in its movement did not reach pointer S on account of its already having a larger deflection, arm r in its anticlockwise movement first meets rod S1 and carries it and the pointer S along until it meets arm e. It then leaves pointer S standing and carries along only arm e as far as abutment q1. Here arm e closes contact g and excites relay R5 which opens contact 9 and so puts clutch K2 out of action. Arm r being no longer driven returns under the action of a spring (not shown) to its initial position against abutment q leaving rod S1 and pointer S unaffected. At contact 10 relay R5 completes a holding circuit for itself over contact 12 of relay R6 and therefore remains energized until the next excitation of relay R6, that is until the next transmission. Clutch K2 is out of action until then and continues out of action on account of contact 12 being open until arm e has done its work and set the pointer S.

As shown in Fig. 4 gearing XIV, XV connects shaft d with a counter ZW when the shaft is shifted to the right to drive arm e. The counter is driven so long as arm e is driven by the shaft d. The total movement of the counter is therefore proportional to the product of the pointer deflection and the time it lasts. Hence the counter reading is a measure, say, of the watt-hours delivered if the measuring instrument at the sending end is a wattmeter, or if it is an ammeter, the voltage being constant. For the counter to read watt-hours the gear between it and the motor Mo2 must be suitably designed to take into account, for example, the value of a unit deflection of the pointer in terms of watts or amperes.

K, TR, T in Fig. 3 are means for instantly adjusting the voltage of the mains L2 when pointer S departs considerably from its usual settings. In this case it is assumed that the transmitting measuring instrument is a voltmeter. Adjustable contacts k1, k2 are arranged on the scale Sk2 on each side of the normal position of the pointer so that the pointer touches one or other of them if its deflection is sufficiently altered from normal. The spindle of the pointer S is connected to one pole of a battery, and on encountering contact k1 or k2 the pointer completes the circuit of magnetic clutch K through which motor Mo2 drives the belt TR in one direction or the other. By means of this belt drive a regulating transformer T connected at n1, n2 to an alternating current source is so governed as to increase or diminish the voltage of the mains.

I claim:

1. A remote controlled indicator comprising a movable indicating element adapted to remain where it is set, a member having an active movement for shifting said element in one direction, mechanism for driving said member at a predetermined speed from a constant starting point, means controlled by two successive current modifications received over a transmitting line for putting said mechanism into and out of action, and means co-operating with said element and said shifting member for engaging the element and moving it in a direction opposite to the active movement of said shifting member into engagement with said member in the event that such shifting member should perform an active movement of insufficient extent to bring it into operative relation to said element, and for subsequently returning the shifting member to its initial position.

2. A remote controlled indicator comprising an indicating element, an arm adapted to engage said element, means controlled by received current modifications for rotating said arm and element in one direction for a time interval determined by said current modifications, a second arm movable to engage said element and said first arm to move said element against such arm and to return the latter to its initial position, means for rotating said second arm in the opposite direction to the first arm upon the conclusion of each movement of the first arm, and means for returning the second arm to its initial position.

3. A remote controlled indicator comprising an indicating element, two rotatable arms normally positioned at opposite sides of the element and adapted to engage said element from opposite directions, a constantly rotating driving means, a clutch controlled by received current modifications for connecting one of said arms to said driving means for a limited time to rotate such arm from its initial position through an angle determined by the interval between such current modifications, a second clutch operative on the conclusion of the movement of the first arm determined by the last current modification for connecting the second arm to said driving means through reverse gearing, whereby the second arm is rotated in a direction opposite to that of the first arm, said second arm operating to move said element against the first arm when the latter has stopped short of the element, and means for returning the second arm to its initial position.

4. In a remote controlled indicator the combination with an indicating element, of a movable arm adapted to engage said element on reaching it and deflect the same, means controlled by receiving current modifications for causing rotation of said arm from its initial position through an angle determined by the interval between such current modifications, a second arm movable to engage said first arm and to return the latter to its initial position, a finger on said second arm normally lying in the path of said element and operative to move said element against the first arm when the latter has stopped short of the element, said finger being rendered inoperative on engagement of the second arm with the first, means for moving said second arm in the opposite direction to the movement of the first arm upon the conclusion of such movement, and means for returning said second arm to its initial position.

5. Remote controlled indicating apparatus responsive to successive current modifications spaced by a time interval corresponding to the value to be transmitted, said indicating apparatus comprising driving means operable at a constant speed, means movable from a definite position, means controlled by said successive current modifications for causing said driving means to actuate said movable means through an extent determined by the interval between said current modifications, means for returning said movable means to said definite position subsequent to the last of said current modifications, and indicating means movable by said movable means from a position indicating a previous value directly to a position indicating the new value transmitted.

6. Remote controlled indicating apparatus responsive to successive current modifications spaced by a time interval corresponding to the value to be transmitted, said indicating apparatus comprising driving means operable at a constant speed, means movable from a definite position, means controlled by said successive current modifications for causing said driving means to actuate said movable means through an extent determined by the interval between said current modifications, means for returning said movable means to said definite position subsequent to the last of said current modifications, and means for indicating the position of said movable means at the end of said interval, said indicating means being arranged to remain in said indicating position during the return of said movable means to said definite position.

7. In a telemetric receiver cyclically responsive to signals corresponding to a quantity, positioning means responsive to cyclically transmitted values of said quantity, indicating means positioned thereby and arranged to remain at the last transmitted value of said quantity, said positioning means comprising means operating from a definite position in each cycle for an extent corresponding to the time duration of the signal.

8. In a telemetric receiver cyclically responsive to signals corresponding to a quantity, positioning means responsive to cyclically transmitted values of said quantity, indicating means positioned thereby and arranged to remain at the last transmitted value of said quantity, said positioning means comprising means operating from a definite position in each cycle for an extent corresponding to the time duration of the signal and co-operating with said indicating means for shifting the latter in one direction, and means for shifting said indicating means in the opposite direction.

9. In a telemetric receiver cyclically responsive to signals corresponding to a quantity, positioning means responsive to cyclically transmitted values of said quantity, indicating means positioned thereby and arranged to remain at the last transmitted value of said quantity, said positioning means comprising means operating from a definite position in each cycle for an extent corresponding to the time duration of the signal and co-operating with said indicating means for shifting the latter in one direction, means for positioning said indicating means in the opposite direction, and means for operating the respective positioning means alternately in said directions respectively.

10. Remote controlled indicating apparatus responsive to successive current modifications in a telemetering circuit spaced by a time interval corresponding to the value to be transmitted, said indicating apparatus comprising driving means operable at a constant speed from a power source other than said circuit, means movable from an initial position, means controlled by said successive current modifications in said circuit for causing said driving means to actuate said movable means through an extent determined by the interval between said current modifications, and means responsive to said current modifications in said circuit for returning said movable means to its initial position.

11. A telemetric receiver responsive to signals of time durations proportional to successive values of a quantity, said receiver comprising a motor rotatable at substantially constant speed, and an element operated thereby for time durations corresponding to said signals for integrating said quantity values.

12. In a telemetric receiver cyclically responsive to signals corresponding to a quantity, positioning means responsive to cyclically transmitted values of said quantity, indicating means positioned thereby to continuously indicate said values, said positioning means comprising means operating from a fixed position in each cycle for an extent corresponding to the time duration of the signal.

13. Remote controlled indicating apparatus responsive to successive current modifications in a telemetering circuit spaced by a time interval corresponding to the value to be transmitted, said indicating apparatus comprising means responsive to said current modifications and movable at constant speed from an initial position through an extent determined by the interval between said modifications, and means responsive to said current modifications in said circuit for returning said movable means to its initial position.

14. Remote controlled indicating apparatus of the type wherein an indicator is moved from a position indicating a previous value directly to a position indicating the new value transmitted, said apparatus comprising means responsive to successive current modifications spaced by a time interval corresponding to a value and movable through an extent corresponding with said time interval, and means for setting said indicator to a position determined by the first-mentioned means.

15. Remote controlled indicating apparatus of the type wherein an indicator is moved from a position indicating a previous value directly to a position indicating the new value transmitted, said apparatus comprising means responsive to successive current modifications spaced by a time interval corresponding to a value and movable through an extent corresponding with said time duration, and means for returning the first-mentioned means to an initial position.

16. In a telemetric receiver, an indicating element adapted to operate over a predetermined range; electro-responsive means cyclically operative to position said element, and limit-switch means adapted to cooperate with said electro-responsive means at one end of the range of said indicating means for causing said electro-responsive means to be restored to a position at the other end of said range.

17. Remote controlled indicating apparatus cyclically responsive to current modifications for a time interval corresponding to the value to be transmitted, said indicating apparatus comprising a substantially synchronous motor operable at substantially constant speed, and means movable thereby from its position at the beginning of said interval for a distance corresponding therewith.

18. Remote controlled telemetric receiving apparatus adapted to respond cyclically to current modifications spaced by a time interval in each cycle corresponding to the value to be transmitted, said apparatus comprising an electric motor rotatable at substantially constant speed from a source of electrical power supply, and means cyclically movable by said motor from its position at the beginning of said interval in each cycle for a distance corresponding with said interval, said power supply source furnishing power to said motor concurrently with the operation of said movable means.

19. A telemetric receiver comprising an electric motor operable at substantially constant speed from an electrical supply source, means movable by said motor, and means responsive to current modifications from another electrical supply source for causing operation of the first-mentioned means by said motor for a distance corresponding to the time duration between said current modifications.

20. In a telemetric receiver cyclically responsive to current modifications spaced by a time interval corresponding with the value of the quantity being telemetered, an indicating element, and means to set said indicating element in opposite directions, said means comprising a member movable in response to said current modifications through an extent corresponding with said interval for moving said indicator in one direction and a member for moving said indicator in the opposite direction to a position corresponding with said interval.

KURT WILDE.

Disclaimer 1,985,130.—*Kurt Wilde*, Berlin-Wilmersdorf, Germany. TELEMETRIC RECEIVER. Patent dated Dec. 18, 1934. Disclaimer filed July 19, 1949, by the assignee, *Builders Iron Foundry*.

Hereby enters this disclaimer to claims 5 to 15 inclusive, and claims 17, 18, 19, and 20 of said patent.

[*Official Gazette Aug. 23, 1949.*]

values, said positioning means comprising means operating from a fixed position in each cycle for an extent corresponding to the time duration of the signal.

13. Remote controlled indicating apparatus responsive to successive current modifications in a telemetering circuit spaced by a time interval corresponding to the value to be transmitted, said indicating apparatus comprising means responsive to said current modifications and movable at constant speed from an initial position through an extent determined by the interval between said modifications, and means responsive to said current modifications in said circuit for returning said movable means to its initial position.

14. Remote controlled indicating apparatus of the type wherein an indicator is moved from a position indicating a previous value directly to a position indicating the new value transmitted, said apparatus comprising means responsive to successive current modifications spaced by a time interval corresponding to a value and movable through an extent corresponding with said time interval, and means for setting said indicator to a position determined by the first-mentioned means.

15. Remote controlled indicating apparatus of the type wherein an indicator is moved from a position indicating a previous value directly to a position indicating the new value transmitted, said apparatus comprising means responsive to successive current modifications spaced by a time interval corresponding to a value and movable through an extent corresponding with said time duration, and means for returning the first-mentioned means to an initial position.

16. In a telemetric receiver, an indicating element adapted to operate over a predetermined range; electro-responsive means cyclically operative to position said element, and limit-switch means adapted to cooperate with said electro-responsive means at one end of the range of said indicating means for causing said electro-responsive means to be restored to a position at the other end of said range.

17. Remote controlled indicating apparatus cyclically responsive to current modifications for a time interval corresponding to the value to be transmitted, said indicating apparatus comprising a substantially synchronous motor operable at substantially constant speed, and means movable thereby from its position at the beginning of said interval for a distance corresponding therewith.

18. Remote controlled telemetric receiving apparatus adapted to respond cyclically to current modifications spaced by a time interval in each cycle corresponding to the value to be transmitted, said apparatus comprising an electric motor rotatable at substantially constant speed from a source of electrical power supply, and means cyclically movable by said motor from its position at the beginning of said interval in each cycle for a distance corresponding with said interval, said power supply source furnishing power to said motor concurrently with the operation of said movable means.

19. A telemetric receiver comprising an electric motor operable at substantially constant speed from an electrical supply source, means movable by said motor, and means responsive to current modifications from another electrical supply source for causing operation of the first-mentioned means by said motor for a distance corresponding to the time duration between said current modifications.

20. In a telemetric receiver cyclically responsive to current modifications spaced by a time interval corresponding with the value of the quantity being telemetered, an indicating element, and means to set said indicating element in opposite directions, said means comprising a member movable in response to said current modifications through an extent corresponding with said interval for moving said indicator in one direction and a member for moving said indicator in the opposite direction to a position corresponding with said interval.

KURT WILDE.

Disclaimer 1,985,130.—*Kurt Wilde*, Berlin-Wilmersdorf, Germany. TELEMETRIC RECEIVER. Patent dated Dec. 18, 1934. Disclaimer filed July 19, 1949, by the assignee, *Builders Iron Foundry*.

Hereby enters this disclaimer to claims 5 to 15 inclusive, and claims 17, 18, 19, and 20 of said patent.

[*Official Gazette Aug. 23, 1949.*]